United States Patent [19]

Inoue

[11] Patent Number: 4,960,983
[45] Date of Patent: Oct. 2, 1990

[54] NONCONTACT TYPE IC CARD AND SYSTEM FOR NONCONTACT TRANSFER OF INFORMATION USING THE SAME

[75] Inventor: Takesi Inoue, Itami, Japan

[73] Assignee: Mitsubishi Denki Kabushiki Kaisha, Tokyo, Japan

[21] Appl. No.: 210,231

[22] Filed: Jun. 23, 1988

[30] Foreign Application Priority Data

Sep. 28, 1987 [JP] Japan .................................. 62-240919
Mar. 30, 1988 [JP] Japan .................................. 63-74497

[51] Int. Cl.$^5$ ...................... G06K 7/08; G06K 19/02
[52] U.S. Cl. .................................. 235/449; 235/492; 235/493; 235/488
[58] Field of Search ............... 235/449, 380, 492, 488, 235/493, 439, 440, 450, 487; 360/123

[56] References Cited

U.S. PATENT DOCUMENTS

| | | | |
|---|---|---|---|
| 4,200,227 | 4/1980 | Lemelson | 235/488 |
| 4,416,056 | 11/1983 | Takahashi | 360/123 |
| 4,605,844 | 8/1986 | Haggan | 235/492 |
| 4,650,981 | 3/1987 | Foletta | 235/492 |
| 4,791,283 | 12/1988 | Burkhardt | 235/488 |
| 4,791,285 | 12/1988 | Ohki | 235/492 |
| 4,800,255 | 1/1989 | Imran | 235/492 |
| 4,818,853 | 4/1989 | Ohta et al. | 235/492 |
| 4,841,128 | 6/1989 | Gröttrup et al. | 235/492 |

FOREIGN PATENT DOCUMENTS

| | | |
|---|---|---|
| 2542792 | 9/1984 | France . |
| 58-187857 | 12/1983 | Japan . |
| 58-187860 | 12/1983 | Japan . |
| WO88/03594 | 5/1988 | PCT Int'l Appl. . |

OTHER PUBLICATIONS

"A Magnetic Interface for Chips," *Machine Design*, No. 6, p. 41, Mar. 24, 1988.

*Primary Examiner*—Stuart S. Levy
*Assistant Examiner*—Robert A. Weinhardt
*Attorney, Agent, or Firm*—Leydig, Voit & Mayer

[57] ABSTRACT

A system for noncontact transfer of information between an IC card and a card reader/writer, wherein the IC card and the card reader/writer each comprises an IC chip having a logic circuit and at least one electromagnetically inductive coil for transfer of information integrated therein. A power supply is located at least partly on the IC card for providing power to the IC chip of the IC card.

21 Claims, 4 Drawing Sheets

NONCONTACT TYPE IC CARD AND SYSTEM FOR NONCONTACT TRANSFER OF INFORMATION USING THE SAME

TECHNICAL FIELD

This invention relates generally to a noncontact-type IC card, and more specifically to a system for transferring information between such an IC card and a noncontact-type card reader/writer.

BACKGROUND ART

A credit card, cash card or the like may comprise a noncontact-type integrated circuit (IC) card which, as is well known in the art, is capable of effecting the transfer of information between itself and an external information storage medium by means of a device such as a card reader/writer without electrically contacting (e.g., by means of electrodes, pins, etc.) such device.

A conventional noncontact-type IC card 10 (FIGS. 7 and 8) generally comprises a printed circuit board 11 on which is mounted an IC chip 12 for controlling the operation of the card (including storing data). Also provided on the printed circuit board 11 is an electromagnetic coil 13 for supplying electric power to the IC chip 12 from an external power source, and an electromagnetic coil 14 for effecting transmission and reception of data between the IC chip 12 and a noncontact-type card reader/writer device 15 of an external information storage medium (not shown). The IC chip 12 and the electromagnetic coils 13, 14, together with the printed circuit board 11, are embedded in a protective package (or card body) 16 comprised of a dielectric resin material or the like.

A conventional noncontact-type reader/writer device 15 (FIG. 8) is designed to receive a noncontact-type IC card and comprises a printed circuit board 17 which has two electromagnetic coils 18, 19 provided thereon for respectively supplying electric power from an external source (not shown) and for effecting the transmission/reception of data. When an IC card is properly inserted into the reader/writer device, these coils 18, 19 correspond to and lie substantially opposite to the respective electromagnetic coils 13, 14 of the IC card 10.

In operation, the card reader/writer device 15 and the IC card 10 are properly aligned with each other, as shown in FIG. 8. The coils of the IC card 10 have the same spiral configuration as the coils of the card reader/writer device 15 so that, when the IC card is inserted and held in the card reader/writer, the centers of the coils 13, 14 of the IC card are respectively located substantially opposite the centers of the coils 18, 19 of the card reader/writer. AC current flows from the external source to the power supplying electromagnetic coil 18 of the card reader/writer device 15 and, thus, is induced in the electromagnetic coil 13 of the IC card 10. This induced AC current is converted into DC current by a full-wave rectification circuit or a diode bridge circuit (not shown) in the IC chip 12 to provide electric power for a power supply in the chip. When the IC chip 12 is thus powered, transfer of data may be carried out between the IC card 10 and the card reader/writer 15 since the data transmitting/receiving electromagnetic coil 19 of the card reader/writer and the electromagnetic coil 14 of the IC card are electromagnetically coupled with each other.

In general, the magnitude of an induced electromotive force which is generated in an electromagnetically coupled coil is proportional to the number of turns of the coil and the spiral length of the coil. Thus, in order to achieve highly efficient and reliable data and energy transfer between the IC card and the reader/writer, it is desirable to maximize the number of turns and/or the overall spiral length of the electromagnetic coils of both the IC card and the card reader/writer device.

However, since the electromagnetic coils of both conventional IC cards and card reader/writers are formed by etching copper foil which is provided on the surface of printed circuit boards (and has a thickness of approximately 18-35 microns), the widths of the coil windings and the intervals between adjacent windings are both restricted by the state of the art accuracy of etching. Consequently, in conventional printed circuit board IC cards and card reader/writer devices, it has only been possible to reduce the winding widths and the winding intervals to approximately 50-150 microns.

As a result, attempts to produce IC cards which are capable of highly reliable and efficient transfer of data and power have been hindered in that the etched electromagnetic coils must be physically large in size, thus increasing the overall size of the card. Indeed, to achieve the desired reliability and efficiency, typical etched coils are as large as about one inch in diameter. Moreover, since a large printed circuit board is required to mount large electromagnetic coils thereon, the conventional IC card is vulnerable to bending and breakage. In addition, since the IC chip is mounted on the printed circuit board, the thickness of the conventional IC card is also large (e.g., on the order of several millimeters).

SUMMARY OF THE INVENTION

It is a primary object of the present invention to provide a noncontact-type IC card which is compact and thin.

Another object of the present invention is to provide such a noncontact-type IC card which has a logic circuit for controlling the functions of the card and miniaturized electromagnetic coils for highly efficient data transmission/reception between a reader/writer and the IC card.

A further object of the present invention is to provide such a noncontact-type IC card which has a minimum number of parts and, thus, can be manufactured easily and at low cost.

Other objects and advantages of the invention will be apparent from the following detailed description.

In accordance with the present invention, there is provided an IC card, and a system including the IC card, for noncontact transfer of information between the IC card and a card reader/writer. The IC card includes a first integrated circuit chip comprising a card logic circuit for controlling the operation of the card and card information transfer means including at least a first electromagnetically inductive coil for effecting electromagnetic transfer of information between the card and a reader/writer. Means are provided for coupling the first coil to the card logic circuit. In the system aspects of the invention, the reader/writer has a second integrated circuit chip comprising reader/writer information transfer means having at least a second electromagnetically inductive coil for effecting electromagnetic transfer of information to and from the first coil of the IC card. Supply means are located at least partly on the IC card for providing power to the first integrated circuit chip.

DESCRIPTION OF THE PREFERRED EMBODIMENT

While the invention will be described in connection with certain preferred embodiments, it will be understood that it is not intended to limit the invention to these particular embodiments. On the contrary, it is intended to cover all alternatives, modifications and equivalents included within the spirit and scope of the invention as defined by the appended claims.

Figure 1:
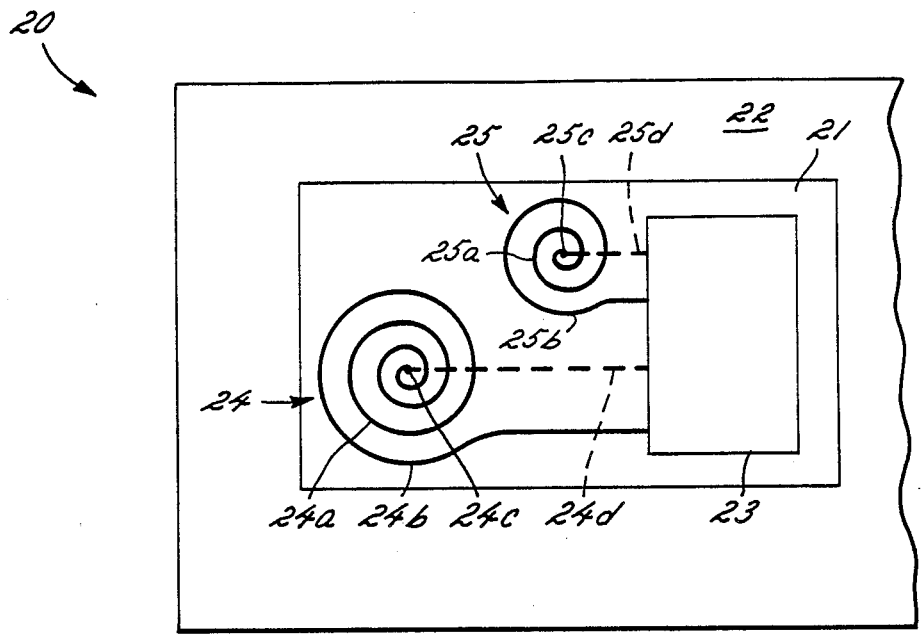
FIG. 1 is a top plan view of a first embodiment of the inventive noncontact-type IC card with a portion of the protective package removed.

Turning now to the drawings, it should be noted that the illustrated IC chips and their associated coils are shown larger than their actual size for purposes of clarity. Referring first to FIG. 1, there is shown an embodiment of a noncontact-type IC card 20 which has an IC chip 21 embedded in a package 22 of dielectric resin or the like. The IC chip 21 may have a CMOS (or other desirable) structure, and has a card logic circuit 23 of well-known integrated circuit design for controlling the functions of the IC card. Though not shown, the logic circuit 23 has a rectification circuit comprising diodes or the like which is formed by using, for instance, a Bi-CMOS process.

In accordance with an important aspect of the present invention, the IC chip 21 further comprises card information transfer means, including a first electromagnetically inductive coil 24 and well-known signal transmission devices, such as amplifiers and discriminators (not shown), for effecting electromagnetic transfer of information to and from the IC card, and a second electromagnetically inductive coil 25 for effecting electromagnetic transfer of energy to the IC card. The etching accuracy which can be attained in wiring patterns in integrated circuit fabrication technology is superior to the etching accuracy on printed circuit boards by as much as about two orders of magnitude. Thus, in integrated circuits having CMOS structure, in particular, wiring patterns (such as coils 24, 25) can be formed which have wire widths—and interval widths between adjacent wires—in the range of 0.5-2.5 microns. Accordingly, due to the greatly enhanced ability to concentrate the turns of the coils 24, 25, the IC chip 21 need only be approximately one square centimeter in size (and have a thickness of only about one millimeter) in order to enable highly reliable and efficient transfer of information and energy between the IC card and an external card reader/writer. In contrast, as discussed above, conventional printed circuit board IC cards require coils which, alone, may be as large as one inch in diameter in order to attain information and energy transfer of substantially equivalent reliability and efficiency.

Moreover, integration of the logic circuit 23 and the inductive coils 24, 25 into one IC chip 21 precludes the need for a printed circuit board. Thus, the overall size of the IC card 20 can be much smaller. In particular, since the thickness of the card is determined primarily by the thickness of the IC chip 21 combined with the dielectric package 22, it can be made substantially thinner than a conventional printed circuit board IC card.

Typically, IC chips comprise a plurality of superimposed layers which are formed in connection with conventional fabrication techniques. Those techniques typically include deposition of metallized connections by depositing (e.g., by sputtering) a thin metallized layer on a semiconductor substrate such as silicon, then etching the metallized layer to form the desired pattern. In the present invention, the inductive coils are comprised of one or more interconnected metallic layers which are deposited on the semiconductor substrate at the same time as the metal pattern associated with the logic circuit 23.

Figure 2:
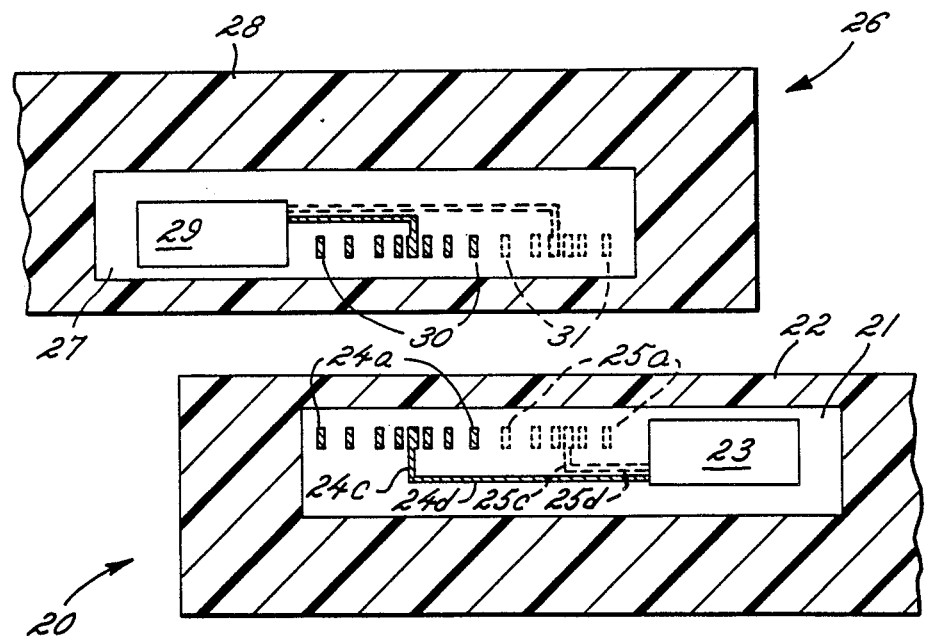
FIG. 2 is a cross-sectional view of the IC card of FIG. 1 and a card reader/writer device.

The embodiment of the IC card 20 shown in FIGS. 1 and 2 includes a pair of inductive coils 24, 25 comprising metallic winding portions (24a and 25a, respectively), each of which has a planar spiral shape and is formed in an upper layer of the plurality of superimposed wiring layers of the IC chip 21. The inductive coils further comprise means for coupling to the logic circuit 23. Specifically, the outer ends 24b, 25b of the planar spiral winding portions 24a, 25a are connected directly to the logic circuit 23, while the center portions 24c, 25c of the spirals are connected to the logic circuit by means of leads 24d, 25d extending through a layer of the IC chip 21 that lies below the layer in which the coils are located.

The card reader/writer 26 similarly comprises an IC chip 27 embedded in a body 28 of dielectric material or the like, and the IC chip 27 has a logic circuit 29 which is coupled to a pair of electromagnetically inductive coils 30, 31 and to an external information storage medium (not shown). Thus, the IC chip 27 has a substantially similar configuration as the chip 21 in the IC card 20, with the two inductive coils 30, 31 of the reader/writer located so as to be inductively interactive with the respective coils 24, 25 of the IC card when the card is inserted into the reader/writer.

Figure 8:
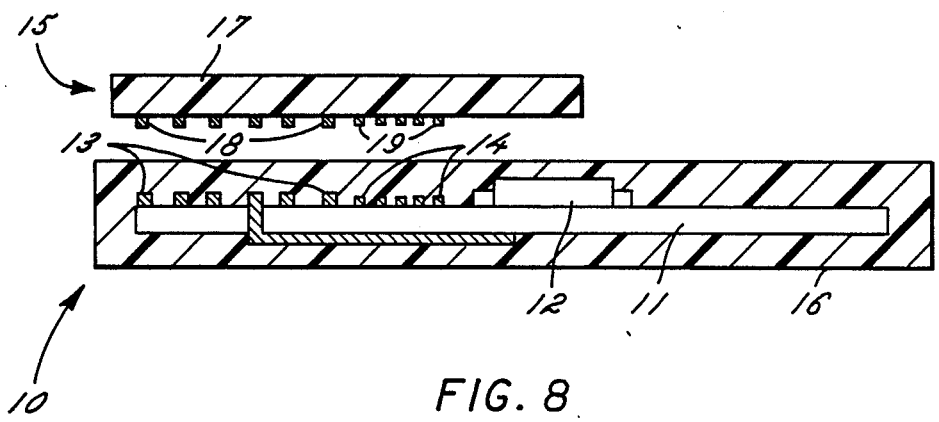
FIG. 8 is a cross-sectional view of the conventional IC card of FIG. 7 and a conventional card reader/writer device.

The operation of the information transfer system of FIG. 2 comprising the IC card 20 and the card reader/writer 26 is, in principle, the same as the operation of the conventional system shown in FIG. 8, although, for the reasons discussed previously, the conventional system is less reliable and efficient. Upon insertion of the IC card 20 into the card reader/writer device 26, the coils 24, 25 of the IC card align with the respective coils 30, 31 of the reader/writer so that transfer of information and energy may occur by means of electromagnetic inductance.

The reader/writer logic circuit 29 allows AC current to flow through the power supplying coil 31, thereby causing an electromotive force to be induced in the inductive coil 25 of the IC card. The AC current induced in the coil 25 is converted to a DC current by means of the rectification circuit (not shown) so as to supply power to the logic circuit 23 of the IC card.

Consequently, transfer of information is enabled between the IC card and the external information storage medium via the inductive coils 24, 30 (and under control of the logic circuits 23, 29) of the IC card and the card reader/writer. The IC card receives information when the logic circuit 29 of the reader/writer causes an AC information signal to flow through its interconnected inductive coil 30 for induction into the corresponding coil 24 of the IC card. Thus, data is provided to the logic circuit 23 and may be written into the memory of the IC card in accordance with well-known procedures. Conversely, the IC card transmits information to the reader/writer (and the external information storage medium) when its logic circuit 23 causes an AC information signal to flow through the interconnected coil 24 for induction into the corresponding coil 30 of the reader/writer.

Although, as in the above-described embodiment, both the power supplying electromagnetic coils 25, 31 and the data transmitting/receiving coils 24, 30 may be formed in the wiring layers of the respective IC chips 21, 27 of the IC card and card reader/writer, the power supplying coils 25, 31 are not required when the IC card comprises a miniature battery as its power source.

Figure 3:
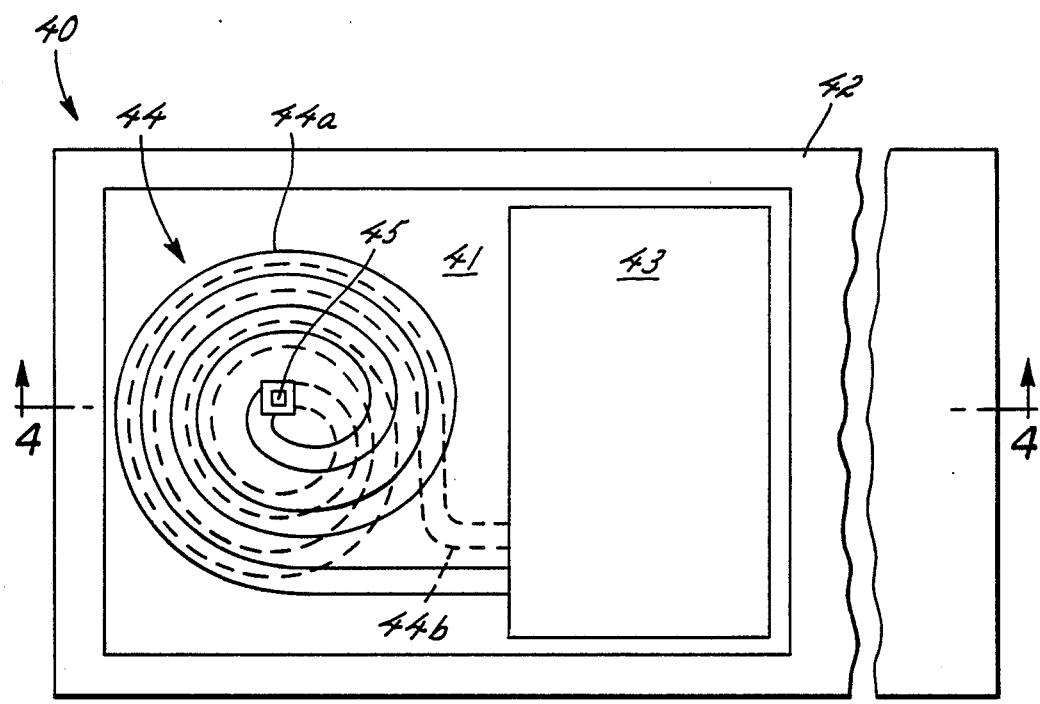
FIG. 3 is a top plan view similar to FIG. 1 and illustrating a second embodiment of the present invention.
Figure 4:
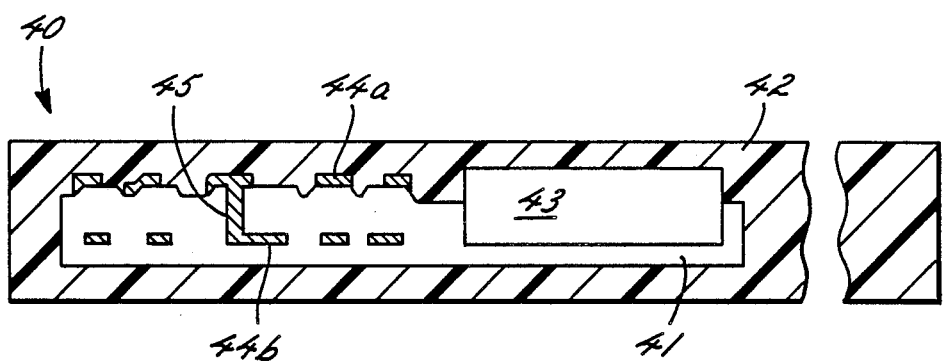
FIG. 4 is a cross-sectional view taken along the line 4—4 in FIG. 3.

As described previously, due to the multi-layer configuration of an IC chip, it is possible to form at least one of the inductive coils in the chip so that it comprises two or more interconnected planar spiral winding portions. Referring now to FIGS. 3 and 4, a second embodiment of an IC card 40 (or a card reader/writer—not shown) in accordance with the present invention is illustrated which comprises an IC chip 41 embedded in a protective body 42 of dielectric resin or the like. The IC chip includes a logic circuit 43 (configured to function in substantially the same manner as the logic circuit 23 in the FIG. 1 embodiment) which is interconnected to at least one electromagnetically inductive coil 44 for transferring information to and from an external data storage medium (not shown). A second coil may be provided for transfer of energy between the IC card and an external power source, if desired.

The coil 44 comprises two planar spiral winding portions (44a and 44b) which are located in two distinct wiring layers of the IC chip 41 and are configured so as to be substantially superimposed on one another. These two planar winding portions 44a, 44b are connected to one another by means of a central conductive member 45 which extends between the distinct wiring layers in which the spiral portions lie. In the illustrated embodiment, the uppermost planar winding portion 44a spirals inwardly in a clockwise direction while the other planar winding portion 44b spirals outwardly in a clockwise direction (i.e., the two planar portions have the same winding direction from an inductive standpoint). Thus, the two windings, when connected at their centers by means of the central conductive member 45, combine to effectively form a coil 44 with twice the number of turns and, thereby, greatly increased inductive characteristics. Therefore, the coil 44 may inductively transmit and receive data with increased reliability and efficiency.

It will be appreciated that the data transmitting/receiving coil 44 may comprise three or more planar winding layers, interconnected end-to-end by a plurality of central conductive members (such as member 45). Thus, if adjacent winding portions have the same inductive winding direction, the coil 44 will be able to transmit and receive information with further increased reliability and efficiency. In addition, although the IC card embodiment of FIGS. 3 and 4 has practically all of the two planar spiral winding portions 44a, 44b superimposed on each other, it will be appreciated that an alternate arrangement is possible in which only certain portions of the planar spiral winding portions are superimposed.

A power supplying coil (such as coil 25 in FIG. 1) may comprise a multi-layer configuration similar to that of the data transmitting/receiving coil 44 of FIG. 3 and, thus, also have improved reliability and efficiency.

Figure 5:
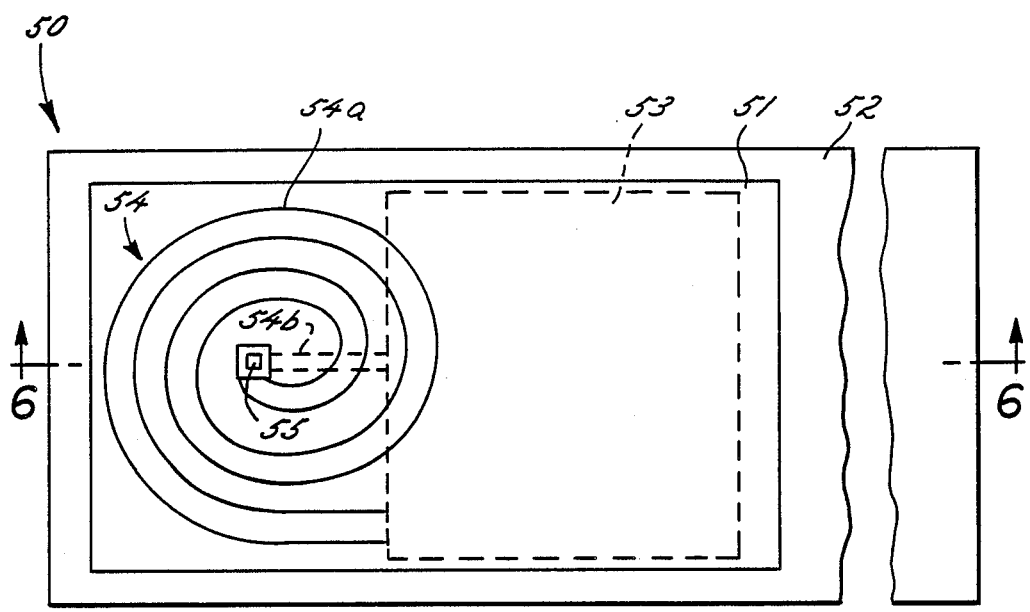
FIG. 5 is a top plan view similar to FIG. 1 and illustrating a third embodiment of the present invention.
Figure 6:
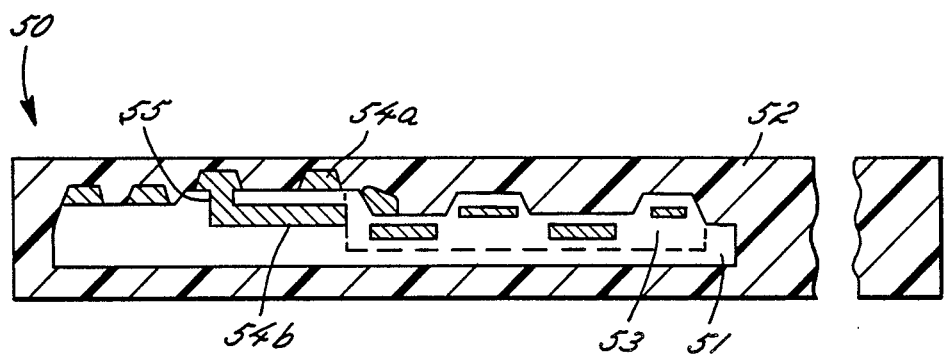
FIG. 6 is a cross-sectional view taken along the line 6—6 in FIG. 5.
Figure 7:
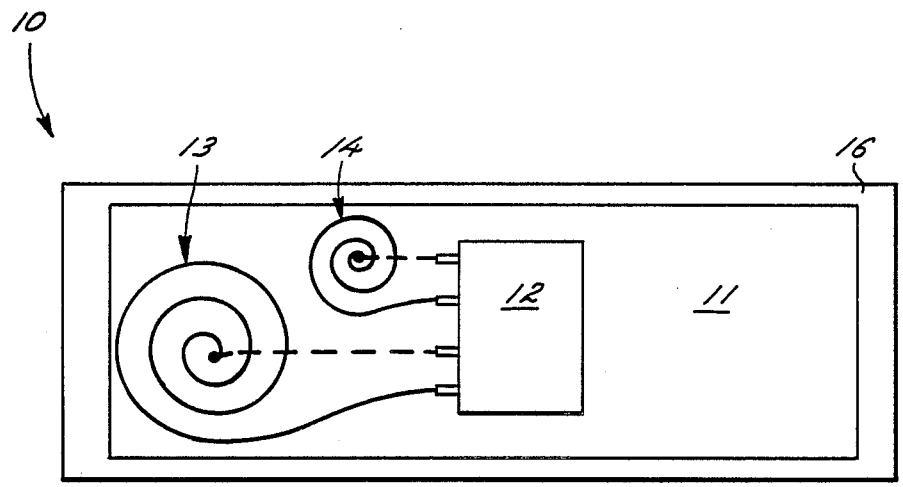
FIG. 7 is a top plan view similar to FIG. 1 and illustrating a conventional noncontact-type IC card.

A third embodiment of the present invention is shown in FIGS. 5 and 6. As in the other embodiments, an IC card 50 (or a card reader/writer—not shown) comprises an IC chip 51 embedded in a protective body 52 of dielectric resin or the like. The IC chip 51 includes a logic circuit 53 for controlling the operation of the card (or reader/writer) and an inductive coil 54 for effecting data transmission and reception. Due to the multilayer configuration of the IC chip 51, part or all of the planar spiral winding portion 54a of the coil 54 may be superimposed on the logic circuit 53. Thus, the degree of integration of the IC chip 51 is further improved so that a more compact IC card may be provided.

While an IC chip having only a data transmitting/receiving coil is shown in FIGS. 5 and 6, it will be appreciated that a power supplying coil may also be formed so as to be superimposed on the logic circuit.

Moreover, it will be appreciated that inductive coils having configurations of any of the three disclosed embodiments may be used with one another for the transfer of energy or data. Thus, for example, an IC card having a planar data transmitting/receiving coil (such as disclosed in the embodiment of FIGS. 1 and 2) will be compatible with a card reader/writer having a multi-level data transmitting/receiving coil (such as disclosed in the embodiment of FIGS. 3 and 4), provided the respective coils are appropriately aligned with one another and have the correct winding directions for inductive transfer of information.

As can be seen from the foregoing detailed description, this invention provides an improved noncontact-type IC card which is substantially thinner and more compact than conventional printed circuit board IC cards. The improved IC card comprises a logic circuit for controlling the functions of the card and electromagnetic coils for power supply and data transmission/reception integrated into an IC chip, thus precluding the need for a printed circuit board. Moreover, a system utilizing the present invention will be capable of highly efficient and reliable noncontact data transmission/reception and energy supply between an IC card and a card reader/writer. This system will not require printed circuit boards or the like and, therefore, will be relatively easy and inexpensive to manufacture.

What is claimed is:

1. In a system for nonconduct transfer of information between an IC card and a card reader/writer, the improvement comprising:

a first integrated circuit chip on the IC card, said first chip comprising a card logic circuit for controlling the operation of said card, card information transfer means on the integrated circuit chip including at least a first electromagnetically inductive coil for effecting electromagnetic transfer of information and means for coupling said first coil to said card logic circuit, said first coil having multiple spiral windings with at least the innermost of said windings enclosing an area on the chip which is smaller than the area occupied by the logic circuit;

a second integrated circuit chip on the reader/writer, said second chip comprising reader/writer information transfer means having at least a second electromagnetically inductive coil for effecting electromagnetic transfer of information to and from said first coil of said IC card; and supply means located at least partly on said IC card for providing power to said first integrated circuit chip.

2. The improved system of claim 1 wherein at least one of said integrated circuit chips has a CMOS structure.

3. The improved system of claim 1 wherein at least one of said coils has a planar configuration.

4. The improvement system of claim 1 wherein at least one of said integrated circuit chips has a plurality of distinct layers and its corresponding coil comprises a plurality of coil members formed in said distinct layers and electrically connected to one another so as to increase the electromagnetic inductance of said coil.

5. The improved system of claim 4 wherein said plurality of coil members are disposed in axial alignment and electrically connected in series.

6. The improved system of claim 5 wherein adjacent coil members have the same inductive winding direction.

7. The improved system of claim 1 wherein said second integrated circuit chip further comprises a reader/writer logic circuit for controlling the transfer of information between said first and second coils and means for coupling said reader/writer logic circuit to said second coil.

8. The improved system of claim 1 wherein said first coil is formed so that at least a portion thereof is superimposed on its respective logic circuit.

9. The improved system of claim 1 wherein said supply means comprises:

a third coil in said first integrated circuit chip coupled to said card logic circuit for supplying power thereto; and a fourth coil in said second integrated circuit chip which is configured to effect electromagnetic transfer of energy to said third coil.

10. The improved system of claim 9 wherein at least one of said coils has a planar configuration.

11. The improved system of claim 9 wherein at least one of said integrated circuit chips has a plurality of distinct layers and at least one of its corresponding coils comprises a plurality of coil members formed in said distinct layers and electrically connected to one another so as to increase the electromagnetic inductance of said coil.

12. The improved system of claim 11 wherein said plurality of coil members are disposed in axial alignment and electrically connected in series.

13. The improved system of claim 12 wherein adjacent coil members have the same inductive winding direction.

14. The improved system of claim 1 wherein each of said integrated circuit chips comprises a semiconductor substrate having a plurality of distinct layers thereon and the associated coil is a metallized pattern formed on at least one layer of said semiconductor substrate.

15. In a system for noncontact transfer of information between an IC card and a card reader/writer, the improvement comprising:

a first integrated circuit chip on the IC card, said first chip comprising a card logic circuit for controlling the operation of said card, card information transfer means on the first integrated circuit chip including a first electromagnetically inductive coil for effecting electromagnetic transfer of information, a second electromagnetically inductive coil and means for coupling said coils to said card logic circuit, each of said first and second coils having multiple spiral windings with at least the innermost of said windings enclosing an area which is smaller than the rear occupied by the logic circuit; and a second integrated circuit chip on the reader/writer, said second chip comprising reader/writer information transfer means including a third electromagnetically inductive coil for effecting electromagnetic transfer of information to and from said first coil of said IC card and a fourth electromagnetically inductive coil which is configured to effect electromagnetic transfer of energy to said second coil of said IC card.

16. An IC card for noncontact transfer of information with a card reader/writer, comprising:

an integrated circuit chip having a logic circuit for controlling the operation of said card, information transfer means on the integrated circuit chip including at least a first electromagnetically inductive coil for effecting electromagnetic transfer of information with said card reader/writer and means for coupling said first coil to said logic circuit, said coil having multiple spiral windings with at least the innermost of said windings enclosing an area on the chip which is smaller than the area occupied by the logic circuit; and supply means located at least partly on said IC card for providing power to said integrated circuit chip.

17. The IC card of claim 16 wherein said integrated circuit chip has a CMOS structure.

18. The IC card of claim 16 wherein said integrated circuit chip comprises a semiconductor substrate having a plurality of distinct layers thereon and said coil is a metallized pattern formed on at least one layer of said semiconductor substrate.

19. The IC card of claim 18 wherein said coil comprises metallized patterns on said plurality of layers, which patterns are electrically connected to one another so as to increase the electromagnetic inductance of said coil.

20. The IC card of claim 16 wherein said coil is formed so that at least a portion thereof is superimposed on said logic circuit.

21. The IC card of claim 16 wherein said supply means comprises a second coil in said integrated circuit chip coupled to said logic circuit for receiving energy from said card reader/writer and supplying that energy to said logic circuit.

* * * * *

UNITED STATES PATENT AND TRADEMARK OFFICE
CERTIFICATE OF CORRECTION

PATENT NO. : 4,960,983

DATED : October 2, 1990

INVENTOR(S) : Takesi Inoue

It is certified that error appears in the above-identified patent and that said Letters Patent is hereby corrected as shown below:

Column 8, line 18, cancel "rear" and insert --area--.

Signed and Sealed this

Twenty-third Day of April, 1991

Attest:

HARRY F. MANBECK, JR.

*Attesting Officer*　　　　*Commissioner of Patents and Trademarks*